United States Patent
Alcorn

(10) Patent No.: US 10,726,073 B2
(45) Date of Patent: Jul. 28, 2020

(54) METHOD AND APPARATUS FOR COMPILING COMPUTATION GRAPHS INTO AN INTEGRATED CIRCUIT

(71) Applicant: Tensil AI Company, San Francisco, CA (US)

(72) Inventor: Thomas David Baxter Alcorn, San Francisco, CA (US)

(73) Assignee: Tensil AI Company, San Francisco, CA (US)

( * ) Notice: Subject to any disclaimer, the term of this patent is extended or adjusted under 35 U.S.C. 154(b) by 0 days.

(21) Appl. No.: 16/666,104

(22) Filed: Oct. 28, 2019

(65) Prior Publication Data
US 2020/0133980 A1    Apr. 30, 2020

Related U.S. Application Data

(60) Provisional application No. 62/751,452, filed on Oct. 26, 2018.

(51) Int. Cl.
| | | |
|---|---|---|
| *G06F 16/00* | (2019.01) | |
| *G06F 16/9035* | (2019.01) | |
| *G06N 3/04* | (2006.01) | |
| *G06F 12/0802* | (2016.01) | |
| *G06F 9/30* | (2018.01) | |

(52) U.S. Cl.
CPC ...... *G06F 16/9035* (2019.01); *G06F 9/30043* (2013.01); *G06F 12/0802* (2013.01); *G06N 3/0418* (2013.01); *G06F 2209/5011* (2013.01)

(58) Field of Classification Search
None
See application file for complete search history.

(56) References Cited

U.S. PATENT DOCUMENTS

| | | | |
|---|---|---|---|
| 7,430,727 B2 | 9/2008 | Cheng et al. | |
| 8,627,246 B2 | 1/2014 | Hershey et al. | |
| 10,489,680 B2* | 11/2019 | Aliabadi | G06N 3/084 |
| 2014/0223439 A1 | 8/2014 | Vigoda | |
| 2019/0004980 A1* | 1/2019 | Maor | G06F 9/3004 |
| 2019/0102671 A1* | 4/2019 | Cohen | G06K 9/6217 |
| 2019/0373264 A1* | 12/2019 | Chong | H03M 7/3071 |

OTHER PUBLICATIONS

International Search Report and Written Opinion in International Application No. PCT/US2019/058363, dated Jan. 23, 2020.

* cited by examiner

*Primary Examiner* — Son T Hoang
(74) *Attorney, Agent, or Firm* — Cognition IP, P.C.; Edward Steakley

(57) ABSTRACT

Disclosed are systems and methods for a compiler, which can receive a computation workload, and a description of the computation graph of the workload and compile a circuit layout of the workload. In one embodiment, an RTL generator assigns the node operations of the computation graph to a first or second type. In the first type, the workload is loaded and processed in tiles equal to a compute filter width. In the second type, the workload is loaded in tiles larger in size than the width of the compute filter, allowing the compute filter to process more operations in parallel and reach the data needed for the underlying operations more efficiently.

20 Claims, 11 Drawing Sheets

METHOD AND APPARATUS FOR COMPILING COMPUTATION GRAPHS INTO AN INTEGRATED CIRCUIT

CROSS-REFERENCE TO RELATED APPLICATIONS

This application claims the benefit of priority of U.S. Provisional Application No. 62/751,452 filed on Oct. 26, 2018 entitled "METHOD AND APPARATUS FOR COMPILING COMPUTATION GRAPHS INTO AN INTEGRATED CIRCUIT," which is hereby incorporated by reference in its entirety and should be considered a part of this specification.

BACKGROUND

Field

This invention relates generally to the field of hardware compilers and more particularly to hardware compilers generating circuit design and layout customized for an AI workload and its computation graph.

Description of the Related Art

The present disclosure relates to the generation of an application-specific integrated circuit design from a description of a computation graph. A computation graph is a graph in which the vertices represent compute operations and the edges represent data dependencies, for example inputs and outputs. Recent trends in machine learning and neural networks have renewed interest in computation graphs as a means for describing and reasoning about computations with complex data flows. Many major machine learning tools and platforms utilize computation graphs in building, storing, transferring, training and executing machine learning models. Open and widely available exchange formats such as the Open Neural Network Exchange (ONNX) format have been developed to facilitate the use of computation graphs.

The current state of the art for executing computation graphs utilizes flexible hardware with dynamically configurable logic that can implement a variety of compute operations and applications. This hardware is typically driven by a sequence of custom instructions, which must be compiled from the description of the graph using a graph compiler, such as Intel's nGraph. However, this flexibility comes at the cost of lower performance, greater power consumption and more costly production. This trade-off is most visible in contemporary embedded systems, which are dramatically increasing the complexity of functionality offered even as the market demands more performance and better energy efficiency.

Application-specific integrated circuits (ASICs) generated directly from the computation graph offer attractive performance and efficiency advantages. These gains are enabled by hardware-level optimizations including greater parallelization of data flows and the elimination of the structures and operations needed to support dynamic configuration. Application-specific integrated circuits suffer the disadvantage of inflexibility and longer development time, so they are typically used in only the most well-explored applications. If ASIC development were shorter and less costly, their inflexibility would be less disadvantageous, because it would be less unattractive to simply develop new ASICs in response to the demands of new applications. To accelerate ASIC development, a means of automatically generating substantial parts of the design and layout is desirable.

To this end, techniques in high-level synthesis have been developed enabling the generation of circuit layouts from behavioral descriptions, but such descriptions are difficult to create for computation graphs created for machine learning applications where the desired behavior is learned from complex, inscrutable data sets. Techniques in compilers have enabled compilation of high-level languages (such as C++ or Java) into hardware constructs suitable for implementation in programmable logic devices, for example field-programmable gate arrays, but programmable logic devices have not been shown to achieve the same levels of performance and efficiency as true application-specific integrated circuits. Additionally, compiling high-level languages to hardware often fails to take full advantage of parallelizable data flows, which are an inherent and explicit feature of computation graphs.

Application-specific integrated circuits (ASICs) can perform computing tasks more efficiently than general purpose computer hardware. In the field of artificial intelligence (AI) workloads, ASICs can offer even more advantages because AI workloads can typically include substantial task and/or data parallelism opportunities that a custom-designed chip can exploit to achieve greater operational efficiencies in hardware.

Nonetheless, the common pitfalls of designing and manufacturing ASICs have slowed down their wide-spread adoption and accessibility. For example, designing and laying out an ASIC that is matched to a computation graph of an AI workload can take months and years and substantial effort to develop. Consequently, there is a need for systems and methods that can more efficiently produce circuit design layouts and interconnects customized to AI workloads and their underlying operations.

SUMMARY

Disclosed are systems and methods for compiling a computation graph 10 directly into a circuit design. A four stage pipeline including a graph normalizer and optimizer 12, 16, 46, a register-transfer level (RTL) description generator 18, 34 paired with a hardware construct library 42, an RTL optimizer 22 and a circuit layout generator 24 and a circuit layout optimizer 28 is used to synthesize an application-specific circuit design from a computation graph description. A computation graph normalizer and optimizer include methods for substituting, fusing, pruning and splitting operations. A hardware construct library includes tags containing optimization information 36 for each construct, which is utilized by an RTL generator to generate efficient designs. An RTL generator also includes methods for connecting hardware constructs, facilitated by interconnect descriptions 38 in a domain-specific language. An RTL optimizer includes methods for reusing repeated components and removing redundant operations. This invention improves over prior art by enabling efficiency and latency advantages through the generation of specialized hardware targeted at computing a single operation; and by leveraging the parallelizable, directed structure of computation graphs to simplify generated designs, resulting in better performance and reduced manufacturing cost.

To illustrate the method, this invention may provide examples described using the Tensorflow GraphDef computation graph description language, the Verilog register-transfer level circuit description language and the FIRRTL register-transfer level circuit description language. However, the described methods and systems are extensible to graphs and circuits expressed by any other structured means.

In one aspect, a method is disclosed. The method includes: receiving an artificial intelligence workload and a computation graph of the artificial intelligence workload, wherein the workload comprises a compute filter, having a filter height and a filter width; normalizing the computation graph; parsing the computation graph and determining node operations of the computation graph; assigning the node operations to a first or second type; and querying a hardware construct library to assign one or more hardware modules to perform the node operations, wherein the hardware modules assigned to the node operations of the first type perform the node operations in part by loading portions of the artificial intelligence workload equal in size to the height and width of the compute filter, and the hardware modules assigned to the node operations of the second type perform the node operations in part by loading a portion of the artificial intelligence workload greater than or equal in size to the width of the compute filter.

In some embodiments, the method further includes, outputting a layout of the hardware modules in silicon.

In another embodiment, the one or more hardware modules assigned to node operations of the first type, comprise a controller, wherein the controller is configured to: query an input row and input column counter, indicating a location of a tile of artificial intelligence workload to be processed; load, from a memory storing the artificial intelligence workload to the local input cache memory, the tile of the artificial intelligence workload, wherein the tile of the artificial intelligence workload is of size equal to the compute filter width and filter height; perform, in parallel, in the one or more hardware modules, the node operations on the tile of artificial intelligence workload; store result of performing the node operations in an output interface memory; increment the input column counter, and wherein if the input column counter overflows, increment the input row counter and reset the input column counter; increment an output column counter, and if the output column counter overflows, increment an output row counter, wherein the output row and output column counters indicate active output storage position; and iterate through querying, loading, performing, storing, and the incrementing until a final input position is reached.

In another embodiment, the controller further comprises a run signal and a done signal, wherein the run and done signals are complementary, and wherein a high run signal and a low done signal indicate the controller is operating and a low run signal and a high done signal indicate the controller is done operating.

In some embodiments, the one or more hardware modules assigned to node operations of the second type, comprise a controller, and a plurality of local input cache memory, wherein the controller is configured to: query a position indicator, indicating a location of a block of artificial intelligence workload to be processed; load, from a memory storing the artificial intelligence workload to the plurality of local input cache memories, the block of the artificial intelligence workload; perform, in parallel, in the one or more hardware modules, the node operations on the block of the artificial intelligence workload, with the compute filter, wherein width of the block of the artificial intelligence workload is greater in size than the width of the compute filter; store results of performing the node operations in an output interface memory; increment an output position counter of the output interface memory; increment an input position indicator; and iterate through querying, loading, performing, storing and incrementing until a final input position is reached.

In one embodiment, the controller is further configured to: store partial results of performing node operations in a stitching cache memory, wherein the node operations having partial results are due to the node operation result depending on data from a next block of artificial intelligence workload to be processed; load, the next block; and perform, in parallel, in the one or more hardware modules, the node operations of the next block, and wherein a stitching module is configured to generate an output in part by merging the partial results with results of performing node operations of the next block; and the stitching module is further configured to store the output in the output interface memory.

In some embodiments, the controller further comprises a run signal and a done signal, wherein the run and done signals are complementary, and wherein a high run signal and a low done signal indicate the controller is operating and a low run signal and high done signal indicates the controller is done performing.

In another embodiment, normalizing the computation graph comprises merging one or more operations from the computation graph, wherein a corresponding hardware module from the hardware construct library performs the one or more operations.

In one embodiment, the node operations comprise convolution and max-pooling.

In another embodiment, wherein assigning to a first or second type is at least partly based on chip area, speed, power consumption and number of the node operations.

In another aspect, a system is disclosed, the system includes: a graph normalizer module configured to receive an artificial intelligence workload and a computation graph of the artificial intelligence workload, wherein the workload comprises a compute filter, having a filter height and a filter width and the graph normalizer is further configured to normalize the computation graph by parsing the computation graph and determining node operations of the computation graph; an RTL generator configured to assign the node operations to a first or second type; and wherein the RTL generator is further configured to query a hardware construct library to assign one or more hardware modules to perform the node operations, wherein the hardware modules assigned to the node operations of the first type perform the node operations in part by loading portions of the artificial intelligence workload equal in size to the height and width of the compute filter, and the hardware modules assigned to the node operations of the second type perform the node operations in part by loading a portion of the artificial intelligence workload greater than or equal in size to the width of the compute filter.

In one embodiment, the system further includes, a layout synthesizer configured to output a layout of the hardware modules in silicon.

In another embodiment, the one or more hardware modules assigned to node operations of the first type, comprise a controller, wherein the controller is configured to: query an input row and input column counter, indicating a location of a tile of artificial intelligence workload to be processed; load, from a memory storing the artificial intelligence workload to the local input cache memory, the tile of the artificial intelligence workload, wherein the tile of the artificial intelligence workload is of size equal to the compute filter width and filter height; perform, in parallel, in the one or more hardware modules, the node operations on the tile of artificial intelligence workload; store result of performing the node operations in an output interface memory; increment the input column counter, and wherein if the input column counter overflows, increment the input row counter and reset the input column counter; increment an output column counter, and if the output column counter overflows, increment an output row counter, wherein the output row and output column counters indicate active output storage position; and iterate through querying, loading, performing, storing, and the incrementing until a final input position is reached.

In some embodiments, the controller further comprises a run signal and a done signal, wherein the run and done signals are complementary, and wherein a high run signal and a low done signal indicate the controller is operating and a low run signal and a high done signal indicate the controller is done operating.

In another embodiment, the one or more hardware modules assigned to node operations of the second type, comprise a controller, and a plurality of local input cache memory, wherein the controller is configured to: query a position indicator, indicating a location of a block of artificial intelligence workload to be processed; load, from a memory storing the artificial intelligence workload to the plurality of local input cache memories, the block of the artificial intelligence workload; perform, in parallel, in the one or more hardware modules, the node operations on the block of the artificial intelligence workload, with the compute filter, wherein width of the block of the artificial intelligence workload is greater in size than the width of the compute filter; store results of performing the node operations in an output interface memory; increment an output position counter of the output interface memory; increment an input position indicator; and iterate through querying, loading, performing, storing and incrementing until a final input position is reached.

In one embodiment, the controller is further configured to: store partial results of performing node operations in a stitching cache memory, wherein the node operations having partial results are due to the node operation result depending on data from a next block of artificial intelligence workload to be processed; load, the next block; and perform, in parallel, in the one or more hardware modules, the node operations of the next block, and wherein a stitching module is configured to generate an output in part by merging the partial results with results of performing node operations of the next block; and the stitching module is further configured to store the output in the output interface memory.

In some embodiments, the controller further comprises a run signal and a done signal, wherein the run and done signals are complementary, and wherein a high run signal and a low done signal indicate the controller is operating and a low run signal and high done signal indicates the controller is done performing.

In one embodiment, normalizing the computation graph comprises merging one or more operations from the computation graph, wherein a corresponding hardware module from the hardware construct library performs the one or more operations.

In some embodiments, the node operations comprise convolution and max-pooling.

In one embodiment, the RTL generator is further configured to assign a first or second type at least partly based on chip area, speed, power consumption and number of the node operations.

BRIEF DESCRIPTION OF THE DRAWINGS

These drawings and the associated description herein are provided to illustrate specific embodiments of the invention and are not intended to be limiting.

DETAILED DESCRIPTION

Figure 1A:
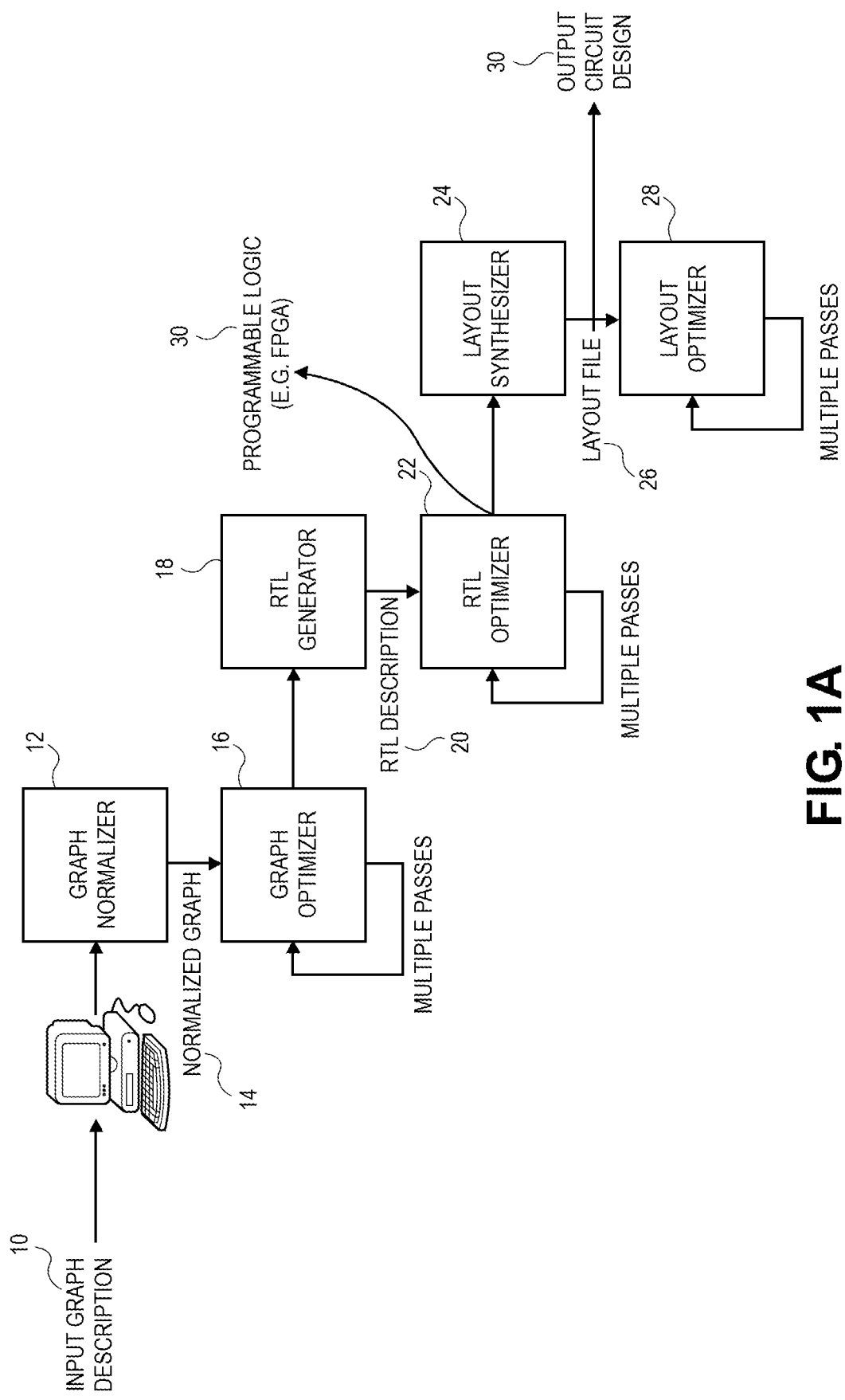
FIG. 1A is a pipeline depiction of a method for compiling a computation graph directly into a circuit design.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Artificial Intelligence Workloads and Custom Hardware

Recent developments in the field of artificial intelligence (AI) have shown a great promise for revolutionizing the utility we can derive from the modern computing systems. Many previously unattainable products are within reach. Applications of AI are unlimited and almost all areas of modern technology can utilize AI to improve their functioning. Autonomous vehicles and airplanes, drones, language and speech processing, image and video processing, population analytics, and many more are among the areas where AI has already made a substantial contribution.

The advent of AI has also demonstrated a need for hardware that can more efficiently process the AI workloads. The AI workloads in many cases can include massive data structures, and voluminous amounts of data. At the same time, there are many opportunities for taking advantage of task and/or data parallelism in processing of AI workloads. While, existing, generic and multipurpose hardware can be used to process AI workloads, they tend to be slow and less capable of taking advantage of task and/or data parallelism inherent in many AI workloads. Hardware, specifically designed for an AI workload, can offer substantial advantages in terms of speed, power consumption and compute power. For example, custom-designed AI chips, as Application Specific Integrated Circuits (ASICs), can offer such advantages. However, current design strategies and channels to translate an AI workload to digital device layout, which an ASIC manufacturer can use to build the device, are still a slow and expensive proposition. Consequently, the goal of AI workload-specific chips remains out of reach for many developers.

The described embodiments, address these issues where a digital design layout of an ASIC, customized for a given AI workload, can be generated in shorter periods of time. Other embodiments, describe configuring the hardware to efficiently process the AI workload. Although, the described embodiments in some instances may have been explained in the context of AI workloads, they can apply to any computation workload and are not necessarily limited to AI workloads.

Improved Workload-Specific ASIC Compiler

Figure 1B:
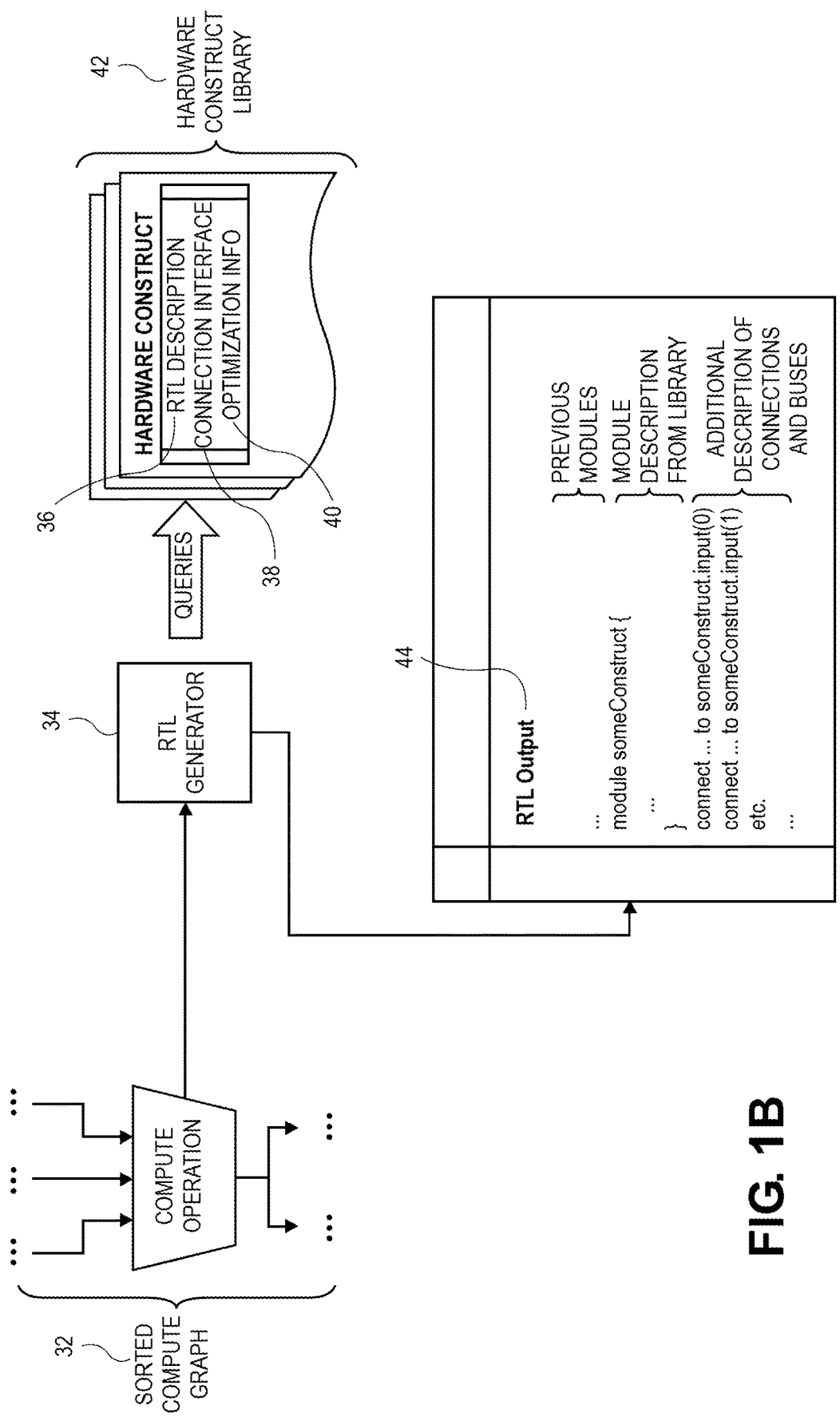
FIG. 1B is an RTL generator querying a library of hardware constructs and generating the RTL output, according to an embodiment.
Figure 1C:
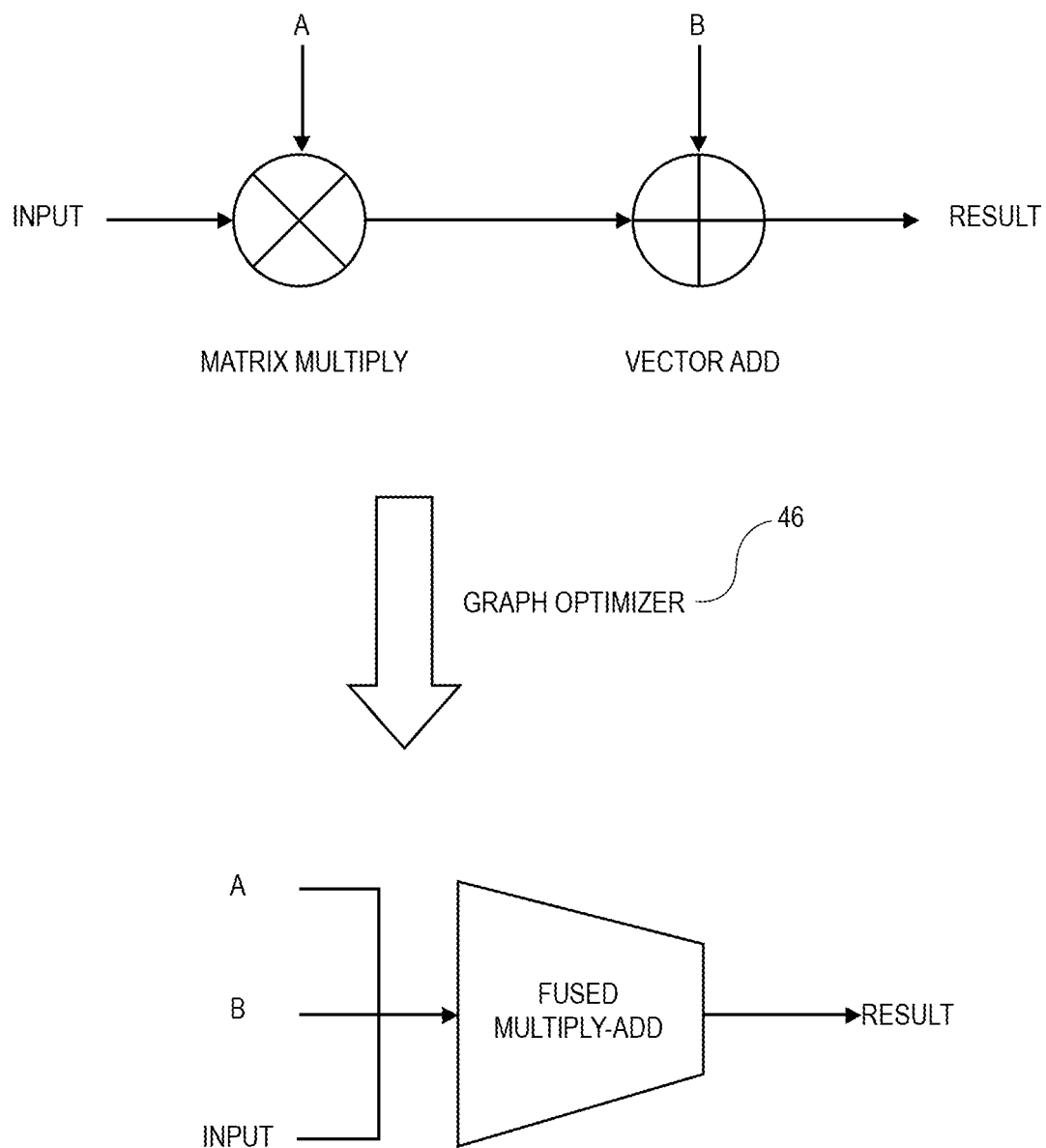
FIG. 1C is an example of a graph optimizer fusing two operations into a single equivalent operation.

Referring to FIGS. 1A-1C, an embodiment for synthesizing an ASIC from a computation graph comprises a pipeline of four stages. In the first stage, the computation graph 10 is parsed from the description provided. The computation graph comprises an in-memory data structure that is straight-forwardly derived from a list of operation definitions which each specify the type of operation to be performed, the other operations from which inputs are to be received, and other configuration parameters that might, for example, non-qualitatively alter the behavior of the operation. A graph normalizer 12 and an optimizer 16, 46 pass over the graph, improving and normalizing it in preparation for the synthesis step. These improvements include: substituting implementations of complex operations in terms of more elementary ones, fusing sequences of operations into a single operation (for which, for example, there is a special-purpose hardware construct), removing or pruning irrelevant operations or branches of operations (which, for example, may have been included in the graph description for reasons irrelevant to the purpose of simply executing the computation), and splitting a single operation or sequence of operations into multiple or a longer sequence of operations (which, for example, may be useful for the purpose of re-using hardware constructs). Once this stage has completed, the graph is in a normalized state 14.

Referring to FIGS. 1A-1C, in the second stage, the register-transfer level (RTL) description 20 of the ASIC is generated from the normalized graph. First, the graph is topologically sorted 32 into an ordering such that each operation is preceded by all of its input operations. This sorting step ensures that a generator has all the necessary information to fully layout the input interconnects for each operation. A generator 34 then passes over the sorted normalized graph, constructing, composing, connecting and programmatically manipulating the RTL description of hardware constructs 40 matched to or derived from each graph operation or sequence of operations.

Referring to FIGS. 1A-1C, this generator makes use of a library of hardware constructs 42 developed for this purpose. Each construct in the library describes its connection interface 38 using a special domain-specific language for hierarchically defining complex interconnects in terms of compositions of simple interconnects. This facilitates connecting hardware constructs together by recursively walking the set of interconnects, breaking each one apart into its components and wiring the connections between the components. The base case of this recursive procedure is to directly wire individual terminals.

Referring to FIGS. 1A-1C and FIG. 5, this generator also includes subroutines for deciding which construct is most appropriate based on the operation in question and the surrounding context. Each construct in a library is tagged with optimization information 36, which may include area cost (e.g., size of the component) and latency cost (e.g., duration of signal propagation across the component). A graph covering method is used to explore the space of mappings of sets of compute graph operations to hardware constructs. It utilizes the hardware construct library and each construct's optimization tags in a recursive tree-like search routine which generates candidate mappings 50, 52 and assigns scores 54, ultimately selecting 56, placing and connecting the best candidate seen.

Referring to FIGS. 1A-1C, in the third stage, the RTL description 20 is optimized using an RTL optimizer 22. These optimizations may include reusing repeated components by, for example, introducing memory components at appropriate locations, or by removing redundant operations. The RTL optimizer parses in the RTL description and searches it for optimization opportunities. The RTL optimizer repeats these operations across multiple passes until the output converges to a final form. At the end of this stage, the artifact is suitable for flashing onto programmable logic 30 such as an FPGA.

Referring to FIGS. 1A-1C, in the fourth stage, the layout synthesizer 24 generates the circuit layout 26 from the RTL description. Then, the layout optimizer 28 makes one or more passes over the layout reconfiguring component placements and traces (wire connections) to, for example, improve the time the signal takes to propagate across the chip.

The disclosed systems and methods take advantage of the parallelizable, directed structure of compute graphs to implement compute operations directly in hardware, resulting in better circuit designs in terms of efficiency, performance and manufacturing cost. By matching each computation graph operation to a hardware construct that is specifically designed to implement it, a faster and more efficient circuit can be designed. In particular, this method enables data to flow through the circuit in a single pass with no or fewer memory accesses, greatly reducing the energy and time spent to execute the computation. A disadvantage of this technique that may be observed is that the computation expressed cannot be reconfigured easily, as in more general-purpose hardware. However, by placing rewritable memory registers within appropriate compute operation constructs, additional flexibility can be regained as desired. Some prior art uses hardware generation techniques that start with a general-purpose computing source code representation (for example, in the programming languages C++ or Java). Some described embodiments, on the other hand, can work from a compute graph representation, which enables more powerful optimizations such as graph covering method, resulting in fewer, simpler components and more efficient use of resources. Working from a compute graph representation also facilitates simpler interconnect layouts which improves latency and decreases manufacturing cost.

Figure 1D:
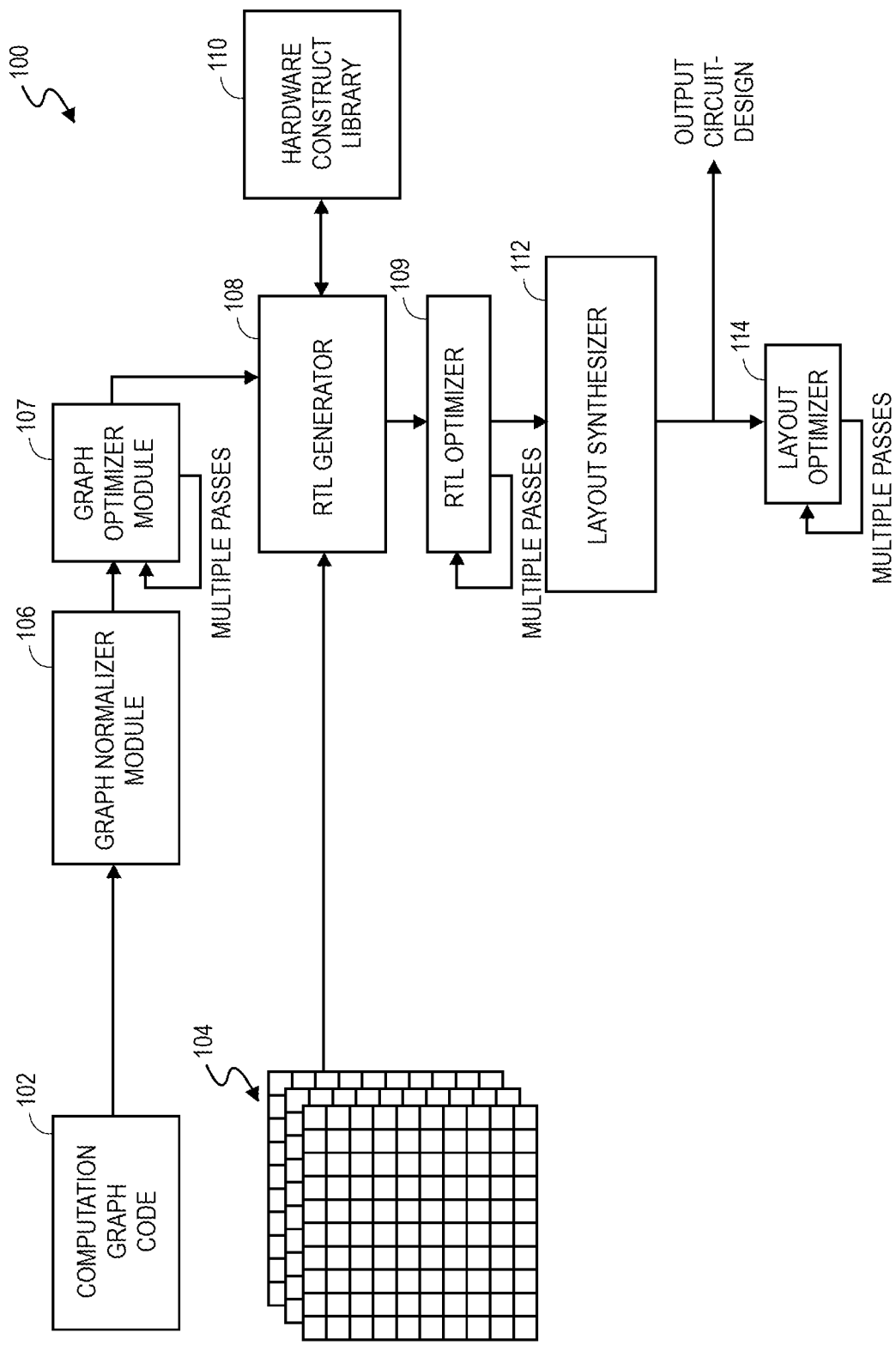
FIG. 1D illustrates a compiler system for receiving a computation workload and its code description to generate a circuit design for the workload.

FIG. 1D illustrates a system 100 for receiving a computation graph 102 of an AI workload 104 and the AI workload 104 to generate a circuit design, which can be used by an ASIC manufacturer to build a chip optimized for processing the AI workload 104. The system 100 can include a graph normalizer module 106, a graph optimizer 107 module, an RTL generator 108, an RTL optimizer 109, a hardware construct library 110, a layout synthesizer 112 and a layout optimizer 114. Not every component is required in every embodiment and some components may be skipped. The operations of the various components of the system 100 can be identical or similar to those described in relation to the embodiments of FIGS. 1A-1C. The operations of the components of the system 100 will be further described in relation to the embodiments of FIGS. 1D-8.

The computation graph 102 can be received in the form of a computation graph code, such as models provided in TensorFlow format. Other formats for computation graph 102 can also be used. The system 100 can use any description of computations, data flow and operations of a computing workload to generate the circuit design of an ASIC customized to handle the workload efficiently. In some embodiments, the computation graph 102 is in the format of a computer program or computer program instructions to operate on one or more computing workloads. The AI workload 104 can include any AI workload, data structures, arrays, vectors, tensors, and others. In one embodiment, the AI workload 104 can be an image of multiple parallel channels (e.g., RGB) having a plurality of pixels or pixel data in the multiple parallel channels. The AI workload 104 can also be data or data structures from any number of sensors used in various applications, such as autonomous driving cameras, radars, light detection and ranging radars (LIDARs), sonars, or any other sensors. Nonetheless, for ease of description, some embodiments are described in terms of AI workloads comprising images, image channels and pixels. Persons of ordinary skill in the art can appreciate that the described systems and methods are applicable to other kinds of AI or computation workloads.

The graph normalizer module 106 can perform a variety of operations to prepare the computation graph 102 to be compiled to a hardware design language. The graph normalizer module 106 can receive the computation graph 102 and parse its content and perform merging operations, where two or more operations are detected to be combinable in one or more hardware or hardware modules available in a hardware construct library 110. For example, a plurality of operations detected in the computation graph 102 can be determined to correspond to a convolution operation where one or more hardware modules in the hardware construct library 110 can be used to implement the convolution operation.

Next, an RTL generator 108 can receive the normalized (and if implemented the normalized and optimized) computation graph 102 and find corresponding hardware modules for the normalized computation graph. In one embodiment, the RTL generator 108 can allocate hardware modules from the hardware construct library 110, based on a categorization of the operations of a node of the normalized computation graph. A first type of operations of a node of the computation graph 102 can be performed with load width equal to a filter width, where the filter width is set by the workload 104. Load width refers to a portion of the AI workload loaded into a local memory accessible by the hardware modules of the operations of the node. The architecture of the first type will be further described in relation to the embodiment of FIG. 2. A second type of operations of a node of the computation graph 102 can be performed with a load width greater than or equal to the filter width, where the filter width is set by the AI workload 104. In the procedure of the second type, more workload data from the AI workload 104 is loaded into a local memory and the filter can process through the AI workload 104 faster, as more data is cached in the local memory accessible by the hardware modules of the node operations. Compared to the first type, the second type is faster, but it also has more associated components and uses more memory storage. The architecture of the second type of operations of a node of the computation graph 102 will be described in relation to the embodiments of FIGS. 3 and 4.

The underlying operations of a node can include a variety of operations and functions that may occur in a computation workload. Examples include convolution and maximum pooling (max-pooling). The described embodiments can also be applied to other operations.

Node Operations of the First Type

Figure 2:
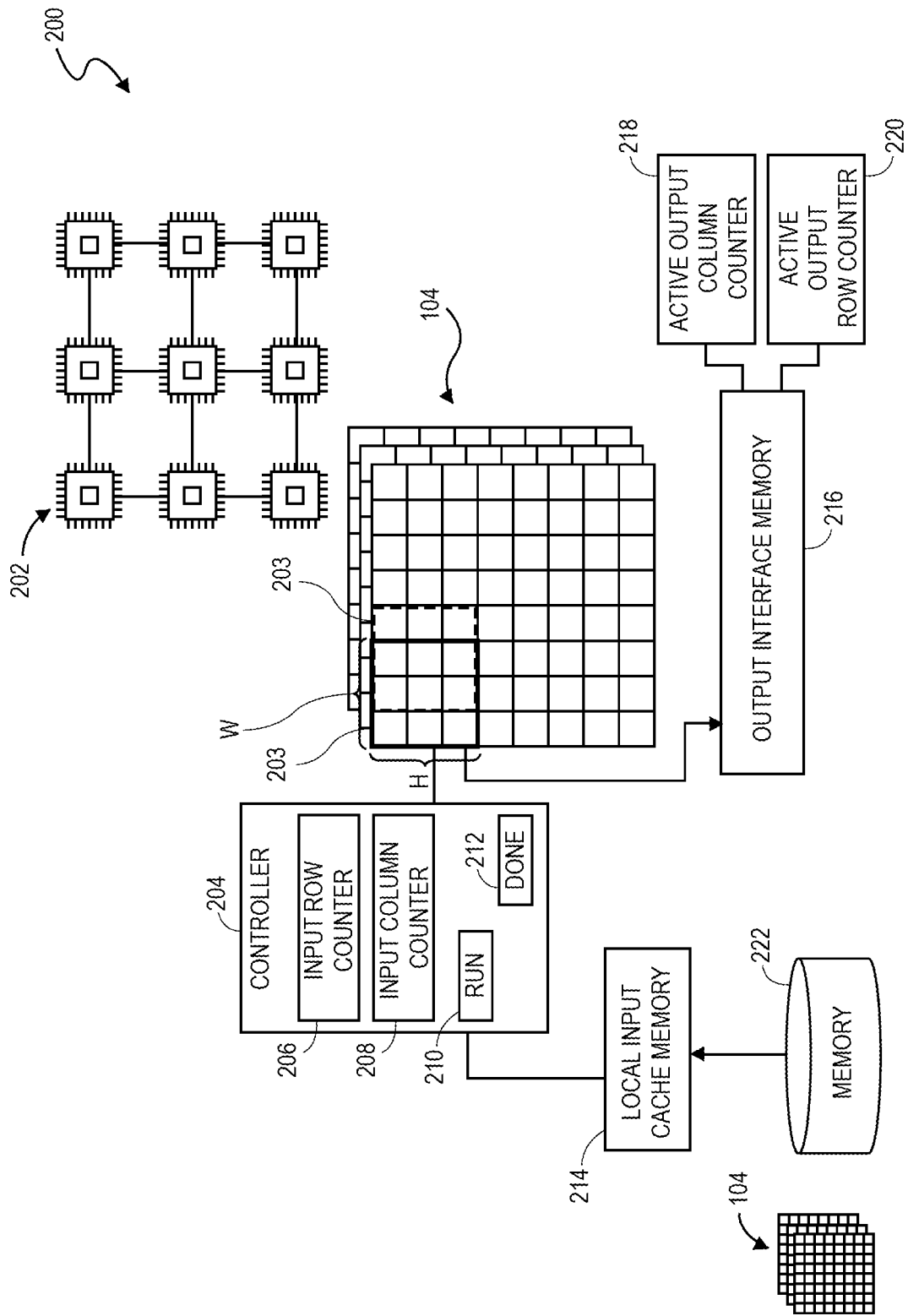
FIG. 2 illustrates a system which utilizes the architecture and procedures of a first type of hardware construct.

FIG. 2 illustrates a system 200 which utilizes the architecture and procedures of the first type of hardware construct to execute node operations. A node of the computation graph 102 and the AI workload 104 can include any of input nodes, hidden nodes, data nodes, function nodes, one or more layers of a neural network, a deep neural network, or any other discrete stage or element of an AI workload and/or computation graph. The RTL generator 108 lays out one or more hardware modules 202 depending on the type, numbers, memory demands and other characteristics of the operations of the node. The RTL generator 108 and/or RTL optimizer 109 can perform optimization operations. For example, the RTL generator 108 and/or the RTL optimizer 109, alone or in combination with layout synthesizer 112 and/or layout optimizer 114, can lay out and interconnect hardware modules 202 in a manner that one or more hardware modules can be reused for suitable parts of the computation graph 202 and the processing of the AI workload 104.

The hardware modules 202 can include one or more controllers 204, local input cache memory 214, an output interface memory 216 and other components depending on the underlying node operations which the system 200 implements. One or more of the hardware modules 202 can correspond to one or more compute filters 203, which can parse the AI workload 104 and execute the corresponding operations of the AI workload 104 in parallel. One or more controllers 204, can control the operations of the compute filters 203. The compute filter 203 has a filter width W and a filter height H, which can be set by the workload 104. In the first type of node operations, the controller 204 loads a portion of the AI workload 104 equal to the filter size (filter width W and filter height H) to a local input cache memory 214, and subsequently the corresponding hardware modules 202 perform the underlying node operations associated with the compute filter 203 in parallel. In one embodiment of the node operations of the first type, the loaded portion of the AI workload can comprise a single pixel.

The controller 204 can include an input row counter 206, an input column counter 208, a run signal 210 and a done signal 212. When the run signal 210 of the initial compute filter 203 is high, the associated controller 204 loads or have loaded a portion of the AI workload 104 into the local input cache memory 214. The local input cache memory 214 can interface with an external, auxiliary or an intermediate memory 222, where the AI workload 104 may be stored. In one embodiment, for the initial compute filter 203, the portion of the AI workload 104 that is initially loaded corresponds to the upper left corner of an image (in the context of the AI workload 104 corresponding to image processing). The compute filters 203 traverse the workload 104 from left to right and perform the underlying operations in parallel and store the results in the output interface memory 216. Other traverse geometries for the compute filter 203 can also be used. In some embodiments, when a compute filter 203 has completed performing its underlying operations, it stores its output results in the output interface memory 216 and increments an active output column counter 218 and an active output row counter 220 depending on which the case may be. The controller 204 can also increment an input column counter 208 when the associated compute filter 203 has performed its underlying operations. The input row counter 206 and the input column counter 208 can correspond to the position of the current active compute filter in the AI workload 104 and indicate where the active processing of the AI workload 104 is underway. Next, the controller 204 determines whether a final input position, within the AI workload 104 is reached. If the final input position is not reached, the controller 204 continues to load the AI workload 104 into the local input cache memory 214 and iterate through the operations outlined above. When the controller 204 determines that a final input position has been reached, it ends its operations. When the compute filter 203 has iterated over all possible input positions of the compute filter 203, the controller 204 toggles the run signal 210 to low and the done signal 212 to high. The high voltage on the done signal 212 signals the end of operations for the compute filter 203.

In some embodiments, each controller 204 can include input row and column counter signals (which is shown in FIG. 2). In another embodiment (now shown), these counters may be external to each controller 204 and globally accessible by all controllers 204.

Node Operations of the Second Type

Figure 3:
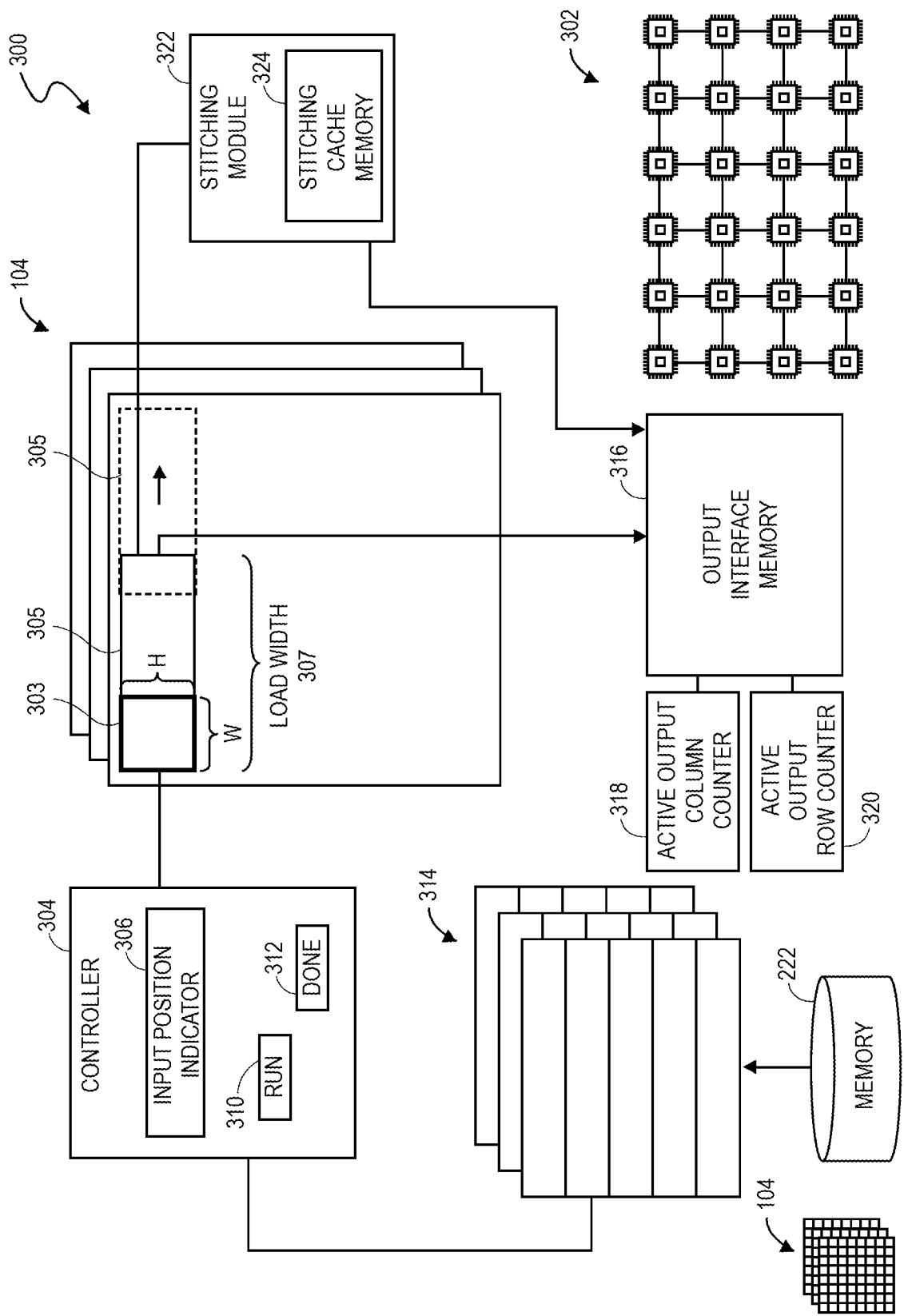
FIG. 3 illustrates a system which utilizes the architecture and procedures of a second type of hardware construct.

FIG. 3 illustrates a system 300 which utilizes the architecture and procedures of the second type of hardware construct to execute node operations. Similar to the first type, if the RTL generator 108 determines that the operations of a node of the computation graph 102 is more efficiently implemented by the architecture and procedure of the second type, the RTL generator 108 lays out one or more hardware modules 302 depending on the type, numbers, memory demands and other characteristics of the operations of the node. The hardware modules 302 of the second type of node operations can include one or more of: controllers 304, local input cache memories 314, stitching modules 322 and output interface memories 316.

Compared with the node operations of the first type, the node operations of the second type are similar to the first type, but more of the AI workload 104 is cached in one or more local input cache memories 314 or other cache memories. One or more of the controllers 304 can correspond to and control the operations of one or more load blocks 305. A controller 304 can process the operations of a portion of the AI workload 104 equal in size to the load blocks 305 by traversing a compute filter 303 along the load block 305. The compute filter 303 has a height of H and a width of W, which can be set by the workload 104. The load block 305 has a load width 307 and a height equal to the filter height H of the compute filter 303. In most cases of the node operations of the second type, the width 307 of the load block 305 is greater than or equal with the width of the compute filter 303, so more parallel data is available to the compute filter 303 to process, without having to load them from an intermediate or external memory 222. The controller 304 can iterate through all the input positions of the load block 305 until the underlying operations are fully implemented.

The controller 304 can query a position indicator, which can indicate the location of a portion of the artificial intelligence workload to be loaded and processed next. Then the controller 304 can load a portion of the artificial intelligence workload 104 equal in size to the load block 305 from an external or intermediate memory 222 to a local input cache memory 314. The controller 304 can then perform the operations of the load block 305 in parallel via one or more compute filters 303, and store the output results in one or more output interface memory 316. The controller 304 can also increment an active output column counter 318 and/or an active output row counter 320, depending on the position of the next output to be stored. These counters can act as an output position indicator indicating to hardware modules 302 of a next operation where to store their results.

Similar to the node operations of the first type, the controller 304 can include a run signal 310 and a done signal 312. When the run signal 310 is high, the controller 304 loads or has loaded a portion of the AI workload 104 equal in size to the load block 305, from an external, auxiliary or intermediate memory 222 to one or more local input cache memories 314. The initial load block 305, can correspond to the upper left corner of an image (in the context of AI workload 104 being image data). The controller 304 performs the node operations of the load block 305 in its corresponding hardware modules 302 and stores the output results in the output memory interface 316, and increments the appropriate active position counters, such as an input position indicator 306. If a load block 305 has reached a final input position, it concludes its operations. If a final input position has not been reached, the controller 304 iterates through the operations above until the final input position has been reached. When the load block 305 has iterated through all possible input positions of the compute filter 305, the controller 304 toggles the run signal to low and the done signal to high. The high done signal on the done signal 312 signals the end of operations for the load block 305.

In some embodiments, the local input cache memories 314 can include column-wise memory layouts or column data structures from the AI workload 104 and arranged in sequential orders for each load block to receive its input data more efficiently and perform more operations in parallel.

Merging Operations

The hardware modules 302 associated with a compute filter 303 perform the operations of the load block 305 until they reach the end of the load block 305, where some portion of the operations of the load block 305 may not be able to be computed because of data dependencies on the next load block 305, which may not be yet loaded. In this scenario, the controller 304 can store partial results, from the operations that cannot be completed without data from the next block, into one or more stitching cache memories 324 of a stitching module 322. The stitching module 322 can receive the computation results from the next block 305 and use the previously stored partial results from the previous load block 305 to perform stitching operations and generate the output results corresponding to the stitched region. The stitching operations can depend on the type and characteristics of the underlying operation. The stitching module 322 can then store the results in the appropriate location in the output interface memory 316.

Figure 4:
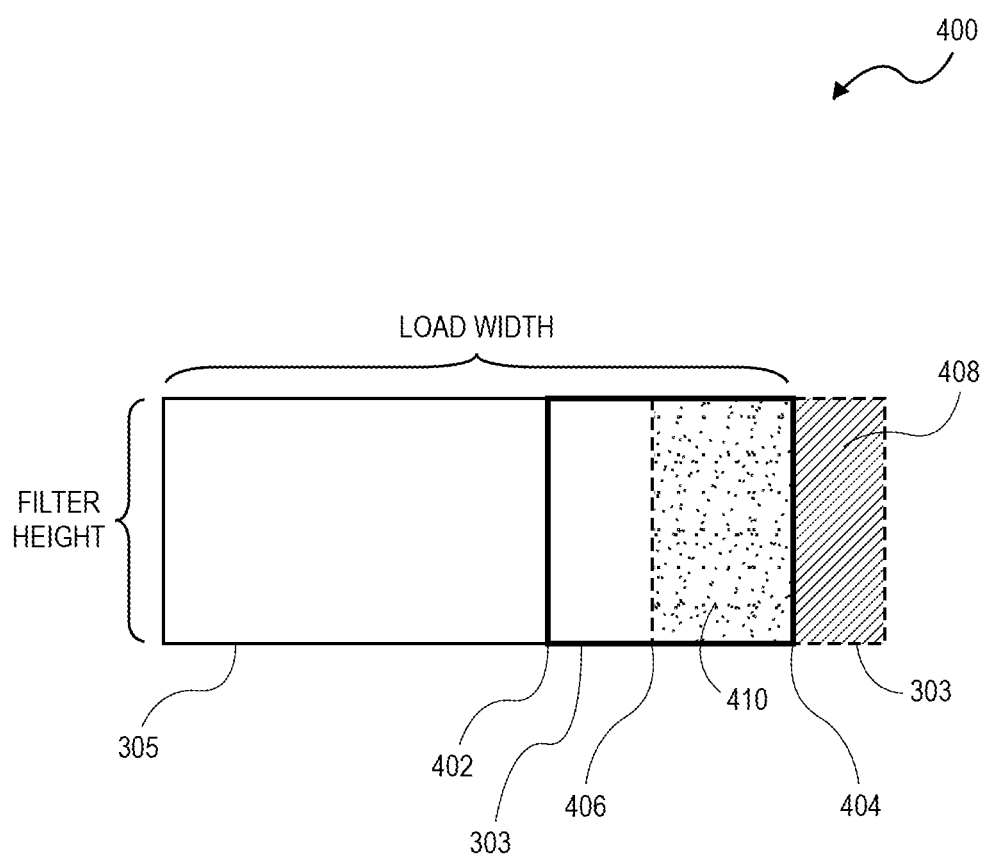
FIG. 4 illustrates merging operations, which can be used in the embodiment of FIG. 3.

FIG. 4 illustrates a block diagram of the stitching operations 400. The load block 305 is loaded into the local input cache memory 314 and the hardware modules 302 associated with one or more compute filters 303 traverse the length of the load block 305 performing the underlying operations of the load block 305 in parallel, until the compute filter 303 reaches the position 402. In some cases, the operations of the load block 305, from the position 402 to the position 404, are the last of the operations of the load block 305 that can be performed without requiring data from subsequent load blocks that may not have yet been loaded into the local input cache memory 314. Starting from the position 406, the compute filter 303 may need data from a subsequent load block 305 to fully compute the output results. In other words, the portions 408, in some cases, cannot be computed, before the next load block 305 is loaded into the local input cache memory 314 and processed. Nevertheless, it may be possible to partially compute the compute filter 303 at the position 406, by generating partial output results that can be calculated from the AI workload data that is already loaded in the local input cache memory 314. The portion 410 of the load block 305 can be calculated and stored in a stitching cache memory 324. When the operations of the next load block 305 are calculated and their results are obtained, they include the previously unavailable results from the portion 408.

In another embodiment, the next load block 305 can be loaded when the compute filter 303 reaches the position 402 in the load block 305. In that scenario, when the compute filter 303 reaches the position 406, the data needed to compute the portion 408 can be obtained from the next load block 305.

A stitching module 322 can generate an output based on the previously cached portion 410 and the newly obtained portion 408. The stitching module 408, then can update the output interface memory 316 accordingly. One or more position indicators can store the position of the portions to be stitched. As a result, when the controller 304 reaches a position where the stitching module 322 is called, the active positions of the output interface memory 316 can be updated to skip the missing outputs and the positions of the portions to be stitched can be passed along to the stitching module 322 to later use for storing the output results from the merged portions 408 and 410.

Type One, Type Two and Other Blocks

In comparison with the node operations of the first type, the node operations of the second type use more components, including more memory storage and more processors to perform more operations in parallel. Consequently, the node operations of the second type can be faster than the node operations of the first type in the sense that they can perform more operations in parallel per time step and finish the node operations faster. The RTL generator 108 can determine whether the first type or the second type architectures and procedures are suited for a node or a portion of a workload. The RTL generator 108 can make that determination based on a variety of considerations, including the amount of space and compute resources a node and its underlying operations may demand. For example, if the node operations are relatively low volume and simple, the RTL generator 108 may allocate hardware modules 202 of the first type to that node. If the node operations require more chip area, then the RTL generator 108 can allocate hardware modules 302 of the second type to the node. Stated otherwise, any node operations can be performed as the first or the second type, but one or the other may be more efficient for a given node operation. Persons of ordinary skill in the art can appreciate that the first and the second type are examples only, and the RTL generator 108 can be configured to assign more than two types of hardware constructs to underlying node operations, where the different types of hardware construct are chosen to optimize for various workload parameters and/or hardware characteristics.

RTL Optimization

The RTL generator 108, alone or in combination with the RTL optimizer 109, can also perform RTL optimization operations. One example of RTL optimization that the RTL generator (or a separate RTL optimizer module) can employ to arrive at a more efficient circuit layout is to parse the computation graph 102 and determine if one or more arguments of any multiple argument operations can be fixed or encoded in a suitable hardware module 202 or 302. For example, if one of the arguments is a constant, instead of using a two-argument hardware module, a one argument hardware module can be used with the constant hard-wired into the one argument hardware module. In another case, the operations receiving binary arguments, can be unaffected with respect to bits that are zeros or bits that are ones (depending on the underlying operation).

Figure 5:
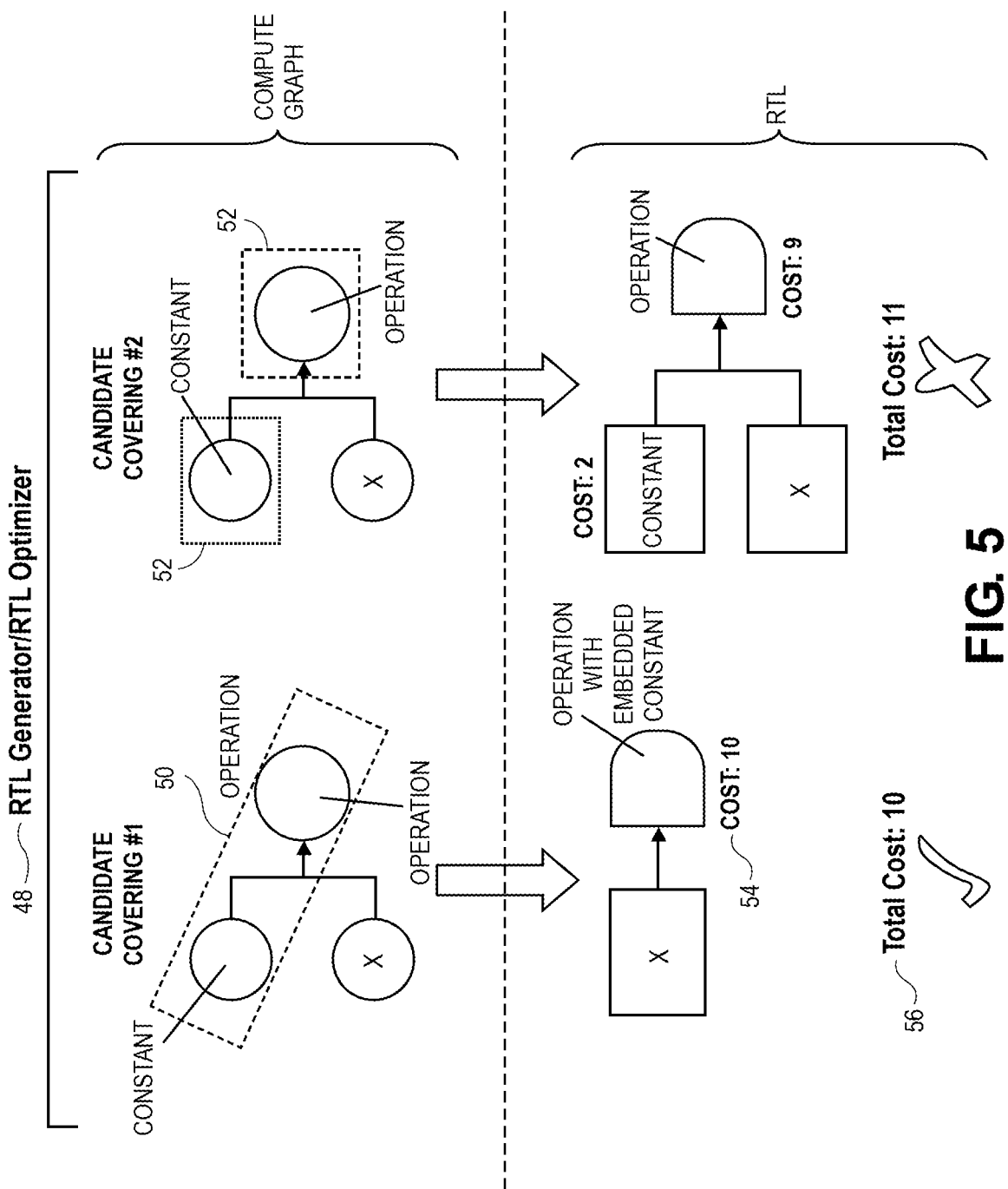
FIG. 5 is a step in RTL generation and/or RTL optimization, where candidate hardware designs are compared using cost information from a hardware construct library.

FIG. 5 is a step in RTL generation and/or RTL optimization, where candidate hardware designs are compared using cost information from a hardware construct library. The RTL generator 108 and/or the RTL optimizer 109 can be configured to compare the cost of various candidate hardware modules in terms of chip area, power consumption, complexity or other characteristics. For example, the hardware module candidate 1 is a one argument hardware implementation because it encodes a constant into the hardware module, while candidate 2 uses a two-argument hardware implementation of the same operation. The RTL generator 108 and/or RTL optimizer 109 can compare the cost between the two candidates and choose the less costly option. In this example, candidate hardware module 1 is less costly because the one-argument hardware implementation used less components, chip area and power consumption, compared to the candidate hardware module 2.

Figure 6:
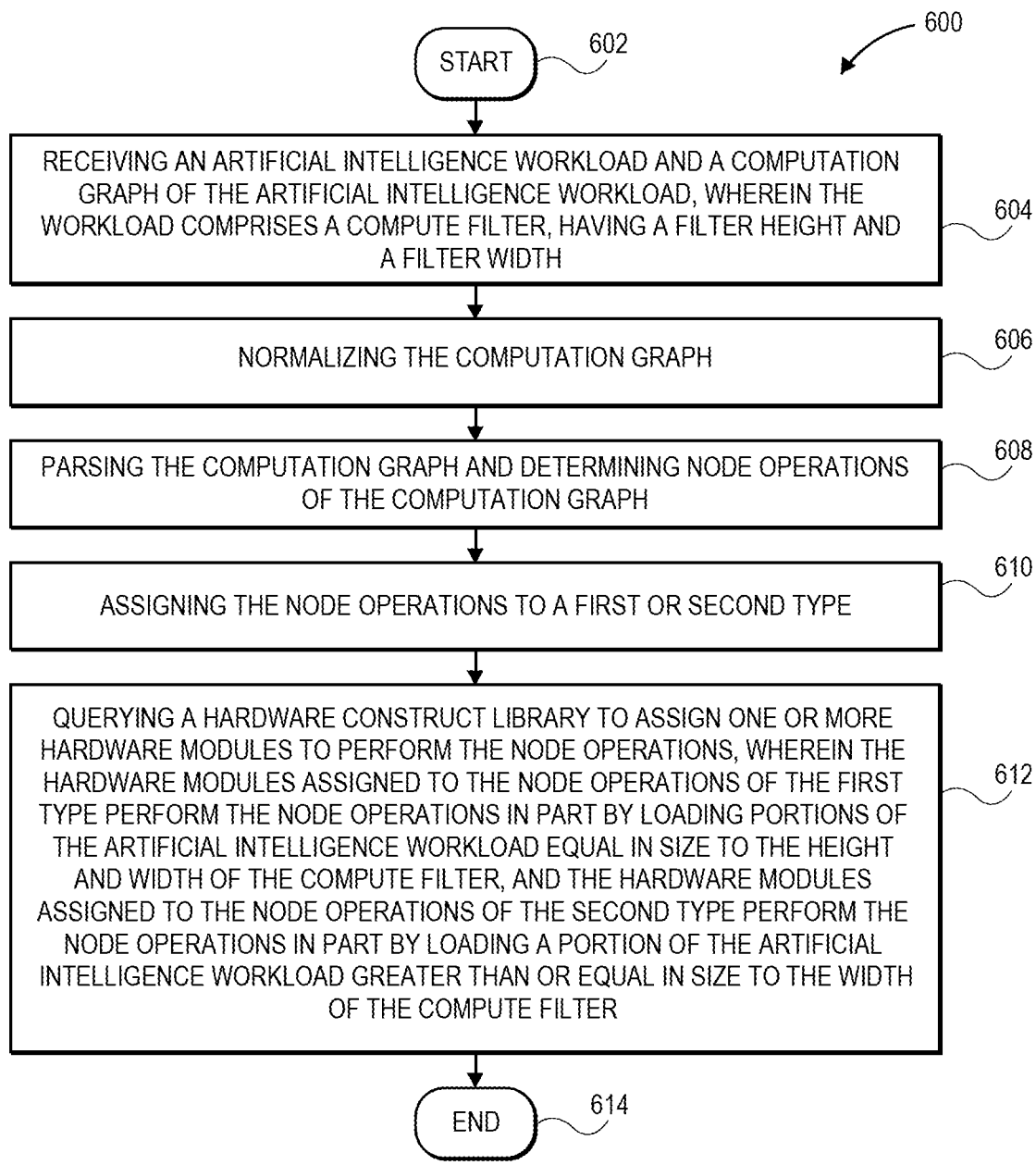
FIG. 6 illustrates a flow chart of a method of generating a circuit design for a computation workload.

Method of Compiling a Circuit Design from an AI Workload and its Computation Graph FIG. 6 illustrates a flow chart of a method 600 of generating a circuit design for an AI workload. The method 600 starts at step 602. The method 600 moves to the step 604 by receiving an artificial intelligence workload and a computation graph of the artificial intelligence workload, wherein the workload comprises a compute filter, having a filter height and a filter width. Next, the method 600 moves to the step 606 by normalizing the computation graph. Next, the method 600 moves to the step 608 by parsing the computation graph and determining node operations of the computation graph. Next, the method 600 moves to the step 610 by assigning the node operations to a first or second type. Next, the method 600 moves to the step 612, by querying a hardware construct library to assign one or more hardware modules to perform the node operations, wherein the hardware modules assigned to the node operations of the first type perform the node operations in part by loading portions of the artificial intelligence workload equal in size to the height and width of the compute filter, and the hardware modules assigned to the node operations of the second type perform the node operations in part by loading a portion of the artificial intelligence workload greater than or equal in size to the width of the compute filter. The method 600 ends at step 614.

Example Method of Node Operations of the First Type

Figure 7:
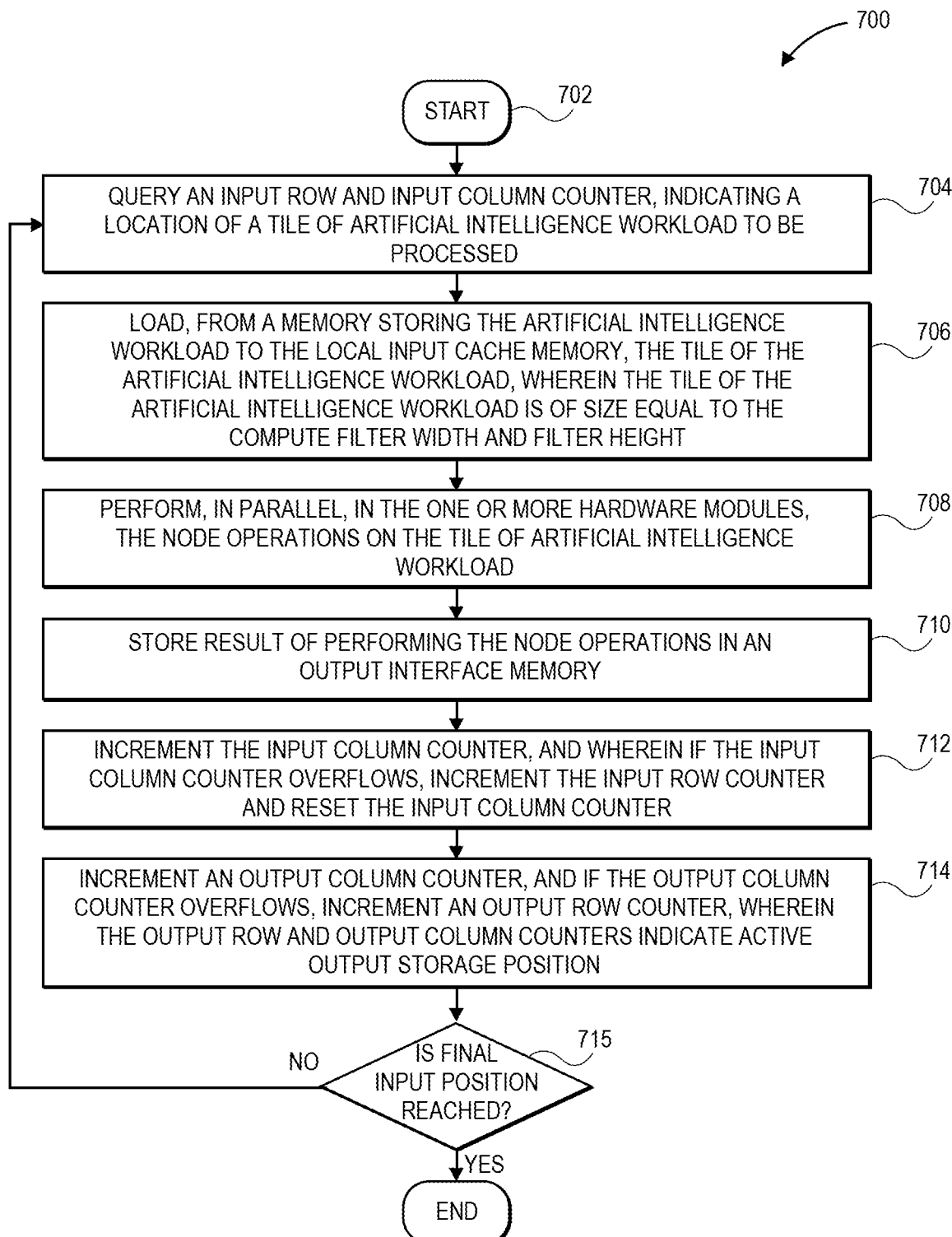
FIG. 7 illustrates a method of node operations according to a first type.

FIG. 7 illustrates a method 700 of node operations according to a first type. The hardware modules 202, described in relation to the embodiment of FIG. 2 can include a controller 204, which can be configured to perform the steps of the method 700. The method 700 starts at step 702. The method 700 moves to step 704 by, querying an input row and input column counter, indicating a location of a tile of artificial intelligence workload to be processed. The method 700 moves to the step 706 by loading, from a memory storing the artificial intelligence workload to the local input cache memory, the tile of the artificial intelligence workload, wherein the tile of the artificial intelligence workload is of size equal to the compute filter width and filter height. The method 700 moves to the step 708 by performing, in parallel, in the one or more hardware modules, the node operations on the tile of artificial intelligence workload. The method 700 moves to the step 710 by storing result of performing the node operations in an output interface memory. The method 700 moves to the step 712 by incrementing the input column counter, and wherein if the input column counter overflows, increment the input row counter and reset the input column counter. The method 700 moves to the step 714 by incrementing an output column counter, and if the output column counter overflows, increment an output row counter, wherein the output row and output column counters indicate active output storage position. At step, 715, the method 700 determines whether a final input position is reached. If a final input position is not reached, the method 700 reverts back to the step 704. If a final input position is reached, the method 700 ends at step 716.

Example Method of Node Operations of the Second Type

Figure 8:
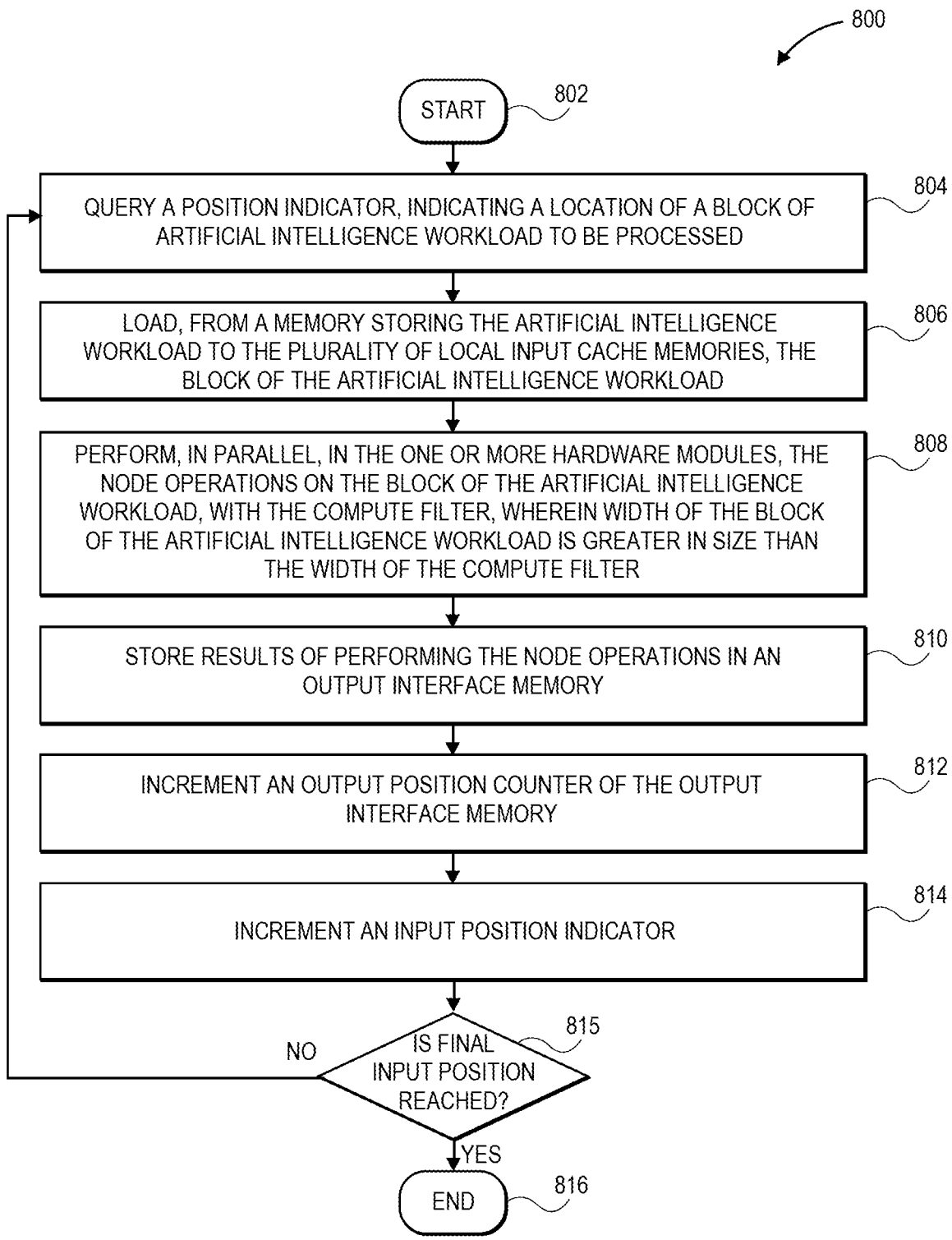
FIG. 8 illustrates a method of node operations according to a second type.

FIG. 8 illustrates a method 800 of node operations according to a second type. The hardware modules 302, described in relation to the embodiments of FIGS. 3 and 4 can include a controller 304, which can be configured to perform the steps of the method 800. The method 800 starts at step 802. The method 800 moves to step 804 by querying a position indicator, indicating a location of a block of artificial intelligence workload to be processed. The method 800 moves to step 806 by loading, from a memory storing the artificial intelligence workload to the plurality of local input cache memories, the block of the artificial intelligence workload. The method 800 moves to step 808 by performing, in parallel, in the one or more hardware modules, the node operations on the block of the artificial intelligence workload, with the compute filter, wherein width of the block of the artificial intelligence workload is greater in size than the width of the compute filter. The method 800 moves to step 810 by storing results of performing the node operations in an output interface memory. The method 800 moves to step 812 by incrementing an output position counter of the output interface memory. The method 800 moves to step 814 by incrementing an input position indicator. At step, 815, the method 800 determines whether a final input position is reached. If a final input position is not reached, the method 800 reverts back to the step 804. If a final input position is reached, the method 800 ends at step 816.

What is claimed is:

1. A method, implemented by at least one computing device, comprising:
   receiving and storing an artificial intelligence workload and a computation graph of the artificial intelligence workload, wherein the workload comprises a compute filter having a filter height and a filter width associated with a local input cache memory;
   normalizing the computation graph;
   parsing the normalized computation graph and determining node operations of the normalized computation graph;
   identifying the node operations as either a first or second type of hardware construct; and
   querying a hardware construct library to assign one or more hardware modules to perform the identified node operations, wherein
     each hardware construct in the hardware construct library describes at least a connection interface using a special domain-specific language associated with the one or more hardware modules,
     the identified node operations of the first type are performed at least in part by loading portions of the artificial intelligence workload equal in size to the height and width of the compute filter, and
     the identified node operations of the second type are performed at least in part by loading a portion of the artificial intelligence workload greater than or equal in size to the width of the compute filter.

2. The method of claim 1, further comprising outputting a layout of the one or more hardware modules in silicon.

3. The method of claim 1, wherein the one or more hardware modules assigned to the identified node operations of the first type, comprise a controller, wherein the controller is configured to:
   query an input row and input column counter, indicating a location of a tile of artificial intelligence workload to be processed;
   load, from a memory storing the artificial intelligence workload to the local input cache memory, the tile of the artificial intelligence workload, wherein the tile of the artificial intelligence workload is of size equal to the compute filter width and filter height;
   perform, in parallel, in the one or more hardware modules, the node operations on the tile of artificial intelligence workload;
   store result of performing the node operations in an output interface memory;
   increment the input column counter, and wherein if the input column counter overflows, increment the input row counter and reset the input column counter;
   increment an output column counter, and if the output column counter overflows, increment an output row counter, wherein the output row and output column counters indicate active output storage position; and
   iterate through querying, loading, performing, storing, and the incrementing until a final input position is reached.

4. The method of claim 3, wherein the controller further comprises a run signal and a done signal, wherein the run and done signals are complementary, and wherein a high run signal and a low done signal indicate the controller is operating and a low run signal and a high done signal indicate the controller is done operating.

5. The method of claim 1, wherein the one or more hardware modules assigned to the identified node operations of the second type, comprise a controller, and a plurality of local input cache memories, wherein the controller is configured to:
   query a position indicator, indicating a location of a block of artificial intelligence workload to be processed;
   load, from a memory storing the artificial intelligence workload to the plurality of local input cache memories, the block of the artificial intelligence workload;
   perform, in parallel, in the one or more hardware modules, the identified node operations of the second type on the block of the artificial intelligence workload, with the compute filter, wherein width of the block of the artificial intelligence workload is greater in size than the width of the compute filter;
   store results of performing the identified node operations of the second type in an output interface memory;
   increment an output position counter of the output interface memory;
   increment an input position indicator; and
   iterate through querying, loading, performing, storing and incrementing until a final input position is reached.

6. The method of claim 5, wherein the controller is further configured to:
   store partial results of performing the identified node operations of the second type in a stitching cache memory, wherein the partial results are due to the results depending on data from a next block of artificial intelligence workload to be processed;
load the next block; and
perform, in parallel, in the one or more hardware modules, the identified node operations of the second type of the next block, and wherein a stitching module is configured to generate an output in part by merging the partial results with results of processing the next block; and
the stitching module is further configured to store the output in the output interface memory.

7. The method of claim 5, wherein the controller further comprises a run signal and a done signal, wherein the run and done signals are complementary, and wherein a high run signal and a low done signal indicate the controller is operating and a low run signal and high done signal indicates the controller is done performing.

8. The method of claim 1, wherein the normalizing the computation graph comprises merging one or more operations from the computation graph, wherein a corresponding hardware module from the hardware construct library performs the one or more operations.

9. The method of claim 1, wherein the identified node operations comprise convolution and max-pooling.

10. The method of claim 1, wherein the identifying of the node operations as the first or second type is at least partly based on chip area, speed, power consumption and number of the node operations.

11. A system comprising:
at least one hardware processor;
a graph normalizer module configured, by the at least one hardware processor, to receive and store an artificial intelligence workload and a computation graph of the artificial intelligence workload, wherein the workload comprises a compute filter, having a filter height and a filter width and the graph normalizer module is further configured, by the at least one hardware processor, to normalize the computation graph, parse the normalized computation graph and determine node operations of the normalized computation graph;
a register-transfer level (RTL) generator configured, by the at least one hardware processor, to identify the node operations as either a first or second type of hardware construct; and
wherein the RTL generator is further configured, by the at least one hardware processor, to query a hardware construct library to assign one or more hardware modules to perform the identified node operations, wherein each hardware construct in the hardware construct library describes at least a connection interface using a special domain-specific language associated with the one or more hardware modules,
the identified node operations of the first type are performed at least in part by loading portions of the artificial intelligence workload equal in size to the height and width of the compute filter, and
the identified node operations of the second type are performed at least in part by loading a portion of the artificial intelligence workload greater than or equal in size to the width of the compute filter.

12. The system of claim 11, further comprising a layout synthesizer configured to output a layout of the one or more hardware modules in silicon.

13. The system of claim 11, wherein the one or more hardware modules assigned to the identified node operations of the first type, comprise a controller, wherein the controller is configured to:
query an input row and input column counter, indicating a location of a tile of artificial intelligence workload to be processed;
load, from a memory storing the artificial intelligence workload to the local input cache memory, the tile of the artificial intelligence workload, wherein the tile of the artificial intelligence workload is of size equal to the compute filter width and filter height;
perform, in parallel, in the one or more hardware modules, the node operations on the tile of artificial intelligence workload;
store result of performing the node operations in an output interface memory;
increment the input column counter, and wherein if the input column counter overflows, increment the input row counter and reset the input column counter;
increment an output column counter, and if the output column counter overflows, increment an output row counter, wherein the output row and output column counters indicate active output storage position; and
iterate through querying, loading, performing, storing, and the incrementing until a final input position is reached.

14. The system of claim 13, wherein the controller further comprises a run signal and a done signal, wherein the run and done signals are complementary, and wherein a high run signal and a low done signal indicate the controller is operating and a low run signal and a high done signal indicate the controller is done operating.

15. The system of claim 11, wherein the one or more hardware modules assigned to the identified node operations of the second type, comprise a controller, and a plurality of local input cache memories, wherein the controller is configured to:
query a position indicator, indicating a location of a block of artificial intelligence workload to be processed;
load, from a memory storing the artificial intelligence workload to the plurality of local input cache memories, the block of the artificial intelligence workload;
perform, in parallel, in the one or more hardware modules, the identified node operations of the second type on the block of the artificial intelligence workload, with the compute filter, wherein width of the block of the artificial intelligence workload is greater in size than the width of the compute filter;
store results of performing the identified node operations of the second type in an output interface memory;
increment an output position counter of the output interface memory;
increment an input position indicator; and
iterate through querying, loading, performing, storing and incrementing until a final input position is reached.

16. The system of claim 15, wherein the controller is further configured to:
store partial results of performing the identified node operations of the second type in a stitching cache memory, wherein the partial results are due to the results depending on data from a next block of artificial intelligence workload to be processed;
load the next block; and
perform, in parallel, in the one or more hardware modules, the identified node operations of the second type of the next block, and wherein a stitching module is configured to generate an output in part by merging the partial results with results of processing the next block; and
the stitching module is further configured to store the output in the output interface memory.

17. The system of claim 15, wherein the controller further comprises a run signal and a done signal, wherein the run and done signals are complementary, and wherein a high run signal and a low done signal indicate the controller is operating and a low run signal and high done signal indicates the controller is done performing.

18. The system of claim 11, wherein the normalizing the computation graph comprises merging one or more operations from the computation graph, wherein a corresponding hardware module from the hardware construct library performs the one or more operations.

19. The system of claim 11, wherein the identified node operations comprise convolution and max-pooling.

20. The system of claim 11, wherein the RTL generator is further configured to identify the node operations as the first or second type at least partly based on chip area, speed, power consumption and number of the node operations.

* * * * *